(12) United States Patent
Plourde et al.

(10) Patent No.: US 6,678,238 B1
(45) Date of Patent: Jan. 13, 2004

(54) MOLD FOR MANUFACTURING DOUBLE-SIDED DISK SHAPED ARTICLES FOR STORING DATA

(75) Inventors: Douglas R. Plourde, Somerset, WI (US); Dean E. Sitz, Wahpeton, ND (US); Jeffrey M. Novotny, Bethel, MN (US); Chad R. Sandstrom, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/474,174

(22) Filed: Dec. 29, 1999

(51) Int. Cl.[7] ............................. G11B 3/70; B29C 11/08
(52) U.S. Cl. ........................................ 369/286; 264/294
(58) Field of Search .................................. 425/810, 812; 264/106–107, 294; 428/694 ML; 369/286

(56) References Cited

U.S. PATENT DOCUMENTS

| | | |
|---|---|---|
| 4,185,955 A | 1/1980 | Holmes et al. |
| 4,391,579 A | 7/1983 | Morrison |
| 4,681,527 A | 7/1987 | Amory et al. |
| 4,707,321 A | 11/1987 | Segawa et al. |
| 4,789,320 A | 12/1988 | Sasamura et al. |
| 5,018,962 A | 5/1991 | Kitamura et al. |
| 5,202,880 A | 4/1993 | Lee et al. |
| 5,460,763 A | 10/1995 | Asai |
| 5,470,627 A | 11/1995 | Lee et al. |
| 5,476,700 A | 12/1995 | Asai et al. |
| 5,607,705 A | 3/1997 | Asai |
| 5,780,068 A | 7/1998 | Shinohara |
| 5,804,229 A | 9/1998 | Asai |
| 5,827,593 A | 10/1998 | Maruyama et al. |
| 5,893,998 A | 4/1999 | Kelley et al. |
| 5,972,461 A | 10/1999 | Sandstrom |

FOREIGN PATENT DOCUMENTS

| | | |
|---|---|---|
| EP | 0018210 | 10/1980 |
| EP | 0 566 032 A2 | 10/1993 |
| JP | 09-048045 | 2/1997 |

*Primary Examiner*—George J. Letscher
(74) *Attorney, Agent, or Firm*—Eric D. Levinson

(57) ABSTRACT

A mold and a process for use in producing data storage articles such as single substrate double-sided disks. In one configuration, a mold for manufacturing a substrate includes a stamper, at least one holder having an interface with the stamper, and a vacuum line for applying a retention force to maintain the interface between the holder and the stamper. In another configuration, the mold includes a demolding line for applying a demolding force to the substrate to aid in separating the substrate from the stamper. The various embodiments of the present invention provide, among other things, easier and faster stamper changeover, substrates and final data storage articles having improved process indicia such as thickness, flatness, inner and outer diameter, and concentricity, and facilitates production of single-substrate double-sided disks.

14 Claims, 3 Drawing Sheets

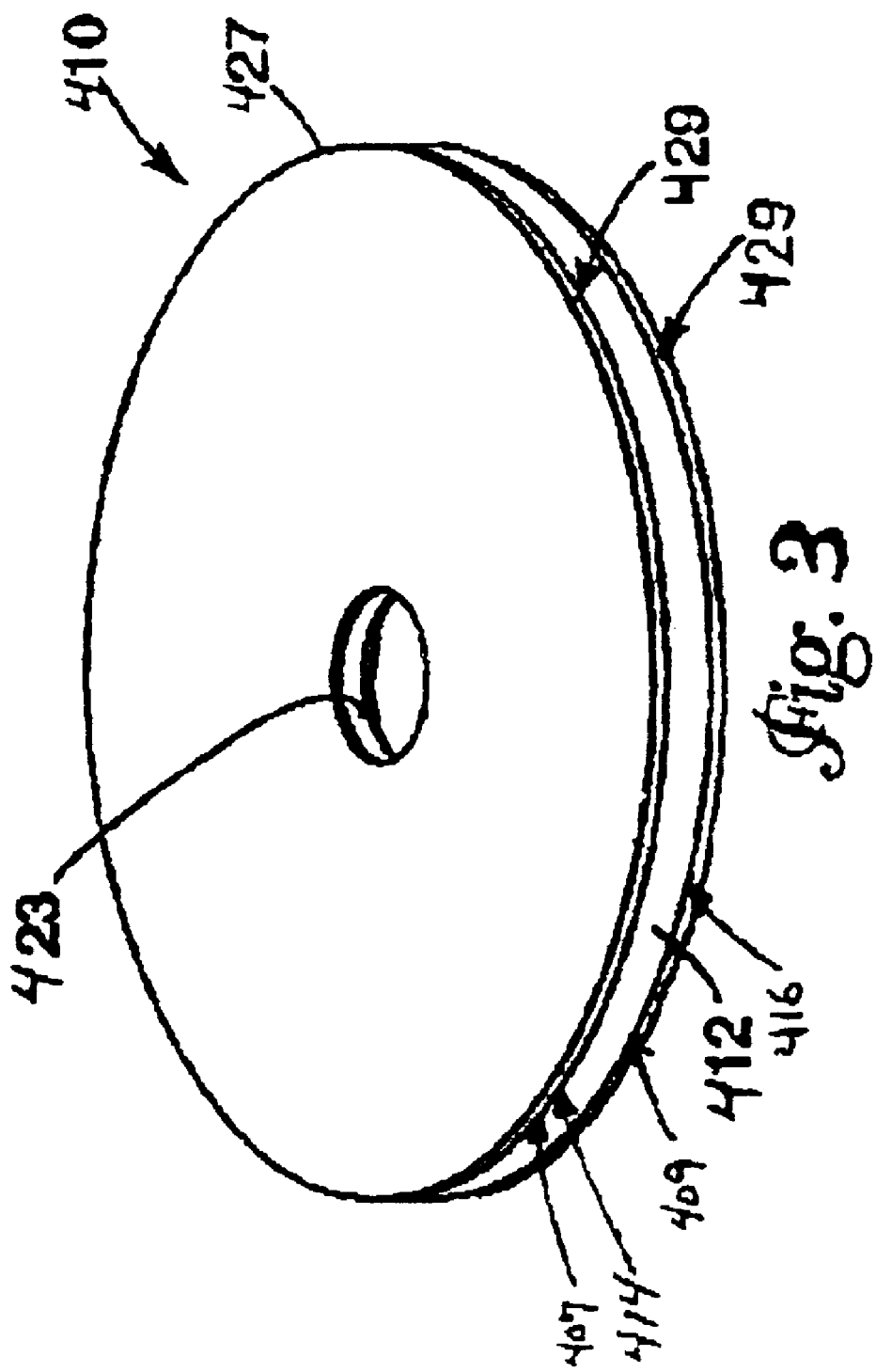

MOLD FOR MANUFACTURING DOUBLE-SIDED DISK SHAPED ARTICLES FOR STORING DATA

FIELD OF INVENTION

This invention relates generally to the field of data storage, and more particularly to a method and apparatus for manufacturing disk-shaped articles for storing data.

BACKGROUND

Conventional molds for manufacturing substrates for data-storage disks typically include a moveable side and a fixed side that when closed, form at least in part the boundaries of a disk shaped cavity. A stamper, typically located on the moveable side of the mold, is used to impart a surface profile onto the formed article or substrate. During the manufacturing process, replacement of the stamper may be necessary to retool the mold for a new product or may be required to assure part quality and, in some cases, stamper changeover occurs frequently.

It is often difficult and time consuming to replace the current stamper in conventional systems. For example, conventional systems often include a holder for clamping the stamper within the mold. The holder is typically retained in place using a mechanical fixture. When the stamper requires replacement, the mechanical fixture is removed to release the holder, the stamper is removed and a new stamper is inserted. The holder is again fixtured into place. This can be a time consuming process especially in applications requiring frequent changeover.

Another characteristic of conventional systems is the difficulty involved in removing the substrate from the mold after molding. One solution has been to use a demolding feature for removing the substrate from the mold. The demolding feature provides pressurized gas directly onto the back face of a substrate to facilitate removal of the disk. The pressurized gas is applied through a set of openings through the wall of the mold cavity. The location of the openings on the wall of the mold is on the side of the mold cavity opposite the stamper. Such a configuration allows passage of mold resin into the openings of the demolding feature during the molding process. Passage of mold resin into these openings or cavities in the wall of the mold cavity can adversely affect the flatness of the substrate.

An additional problem with conventional systems is that cavities may be created between mold components due to those components having different rates of thermal expansion. During the course of operation of a typical mold, temperature of the mold components may vary between room temperature and 130 degrees Celsius or more. Resin flowing into these cavities can also affect process control over thickness, flatness, concentricity, and inner and outer diameter of the formed disk.

Conventional molds have typically been used to produce substrates for disks having information on one side. Disks having information on both sides are typically formed by bonding two single-sided disks with a layer of adhesive. Thus disks having information on both sides, have a tolerance stack up that includes the variation found in each of the two disks and the variation found in the adhesive bond between the disks. Thus it is more difficult to maintain the various process indicia such as thickness, flatness, concentricity and outer diameter when producing double-sided disks.

For the reasons stated above, and for other reasons stated below which will become apparent to those skilled in the art upon reading and understanding the present specification, there is a need in the art for a mold improving the ease of stamper changeover. Furthermore, there is a need for a substrate and final storage article having improved process indicia such as thickness, flatness, concentricity and inner and outer diameter.

SUMMARY

Described herein is an improved mold that addresses the above-described deficiencies found within conventional molds. For example, in one embodiment, the invention is directed to a mold for manufacturing disks and includes a holder that extends over a portion of a stamper. A vacuum line applies a vacuum force on the backside of the holder in order to maintain placement of the holder against the stamper. In another embodiment, the mold includes a demolding line that applies a demolding force to aid in separating the substrate from the stamper. The molds of the various embodiments can be used in the production of single-substrate double-sided articles for storing data on both sides of the data storage article.

BRIEF DESCRIPTION OF DRAWINGS

FIG. 3 is a view of a single-substrate double-sided disk.

DESCRIPTION OF EMBODIMENTS

Figure 1:
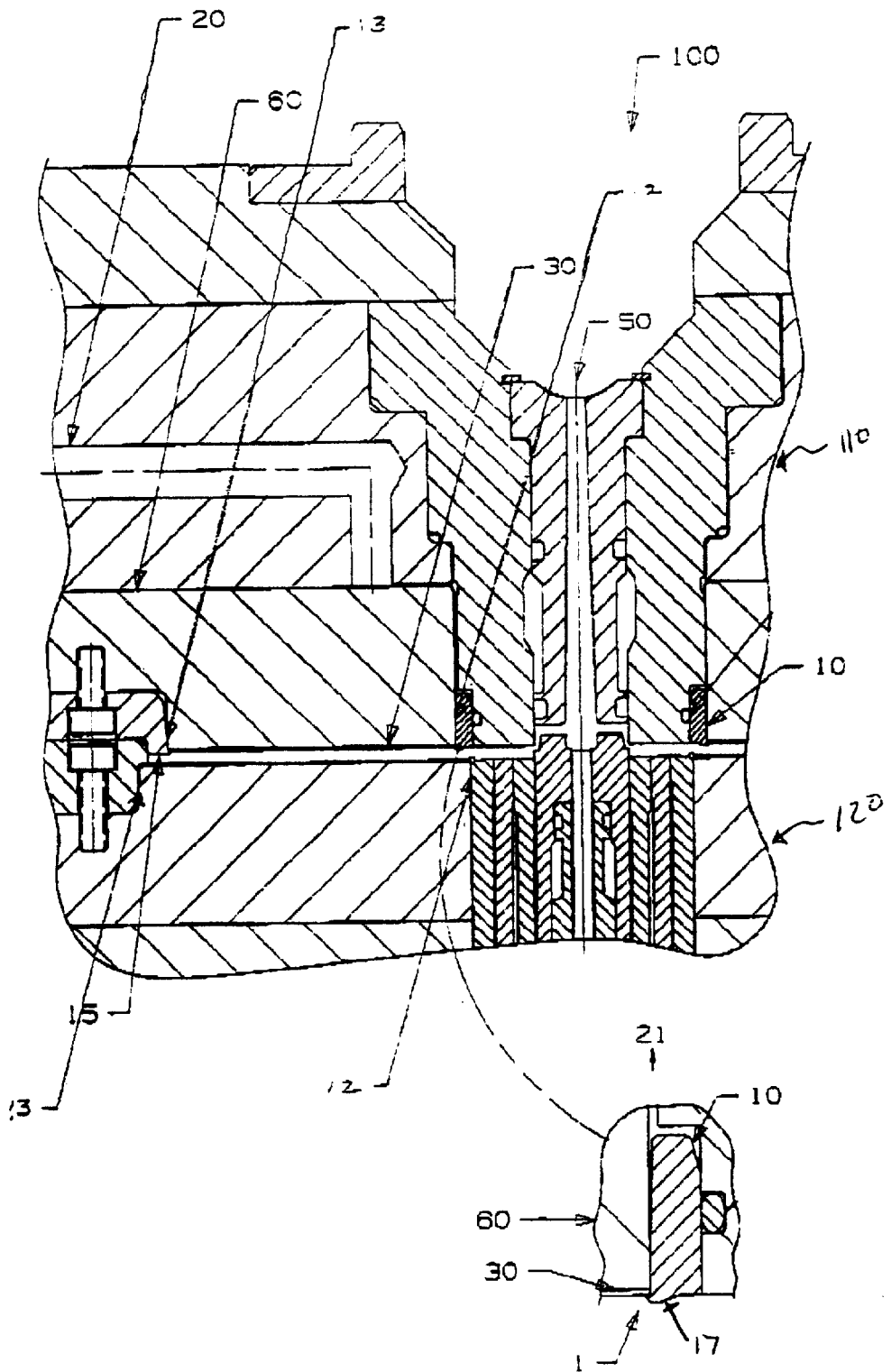
FIG. 1 is a cross sectional view of an embodiment of a mold having a holder and a vacuum line.

FIG. 1 is a cross sectional view of one embodiment of an improved mold 100 that addresses the above-described deficiencies found within conventional molds. The improved mold improves the ease of stamper changeover, provides improved process control over thickness, flatness, concentricity, and inner and outer diameter of the substrate and final data storage article, and facilitates the manufacture of a single-substrate double-sided data storage article.

More specifically, mold 100 includes an outer portion 13 an inner portion 12 that may be quickly changed. In the illustrated embodiment of FIG. 1, outer portion 13 includes a mechanically-fastened holder 15 while inner portion 12 includes two vacuum-driven holders 10. Each holder 10 includes a lip 17 that extends over a portion of a stamper 30. Vacuum line 20 is used to apply a vacuum pressure or retention force 21 to the holder 10 such that lip 17 maintains an interface 11 between the holder 10 and the stamper 30. The interface 11 between the holder 10 and the stamper 30 creates a barrier between the holder 10 and stamper 30 so that mold 100 resin cannot flow through to the vacuum line 20. This prevents resin from entering the vacuum line 20, thus improving control over process indicia of the formed substrate and the final data storage article 410. The holder 10 can be released and the stamper 30 removed by reducing the retention force 21 created by vacuum line 20 and, in one embodiment, supplying a positive force against holder 10 via vacuum line 20, thereby eliminating the need to remove and reinstall fasteners and improving the ease of stamper 30 changeover.

The vacuum-driven holder 10 and vacuum line 20 can be used in any portion of the mold 100 including the inner portion 12 on the fixed side 110 of the mold 100 where space and access to the inner portion 12 of the mold 100 is typically limited. Unlike conventional molds that typically include a stamper only on the moveable side of the mold, the features of this embodiment can be used to create a mold 100 having a stamper 30 on both the fixed side 110 and moveable side 120 of the mold 100. Thus, the mold 100 can be used to produce a substrate 412 for a single-substrate double-sided storage article 410.

Figure 2:
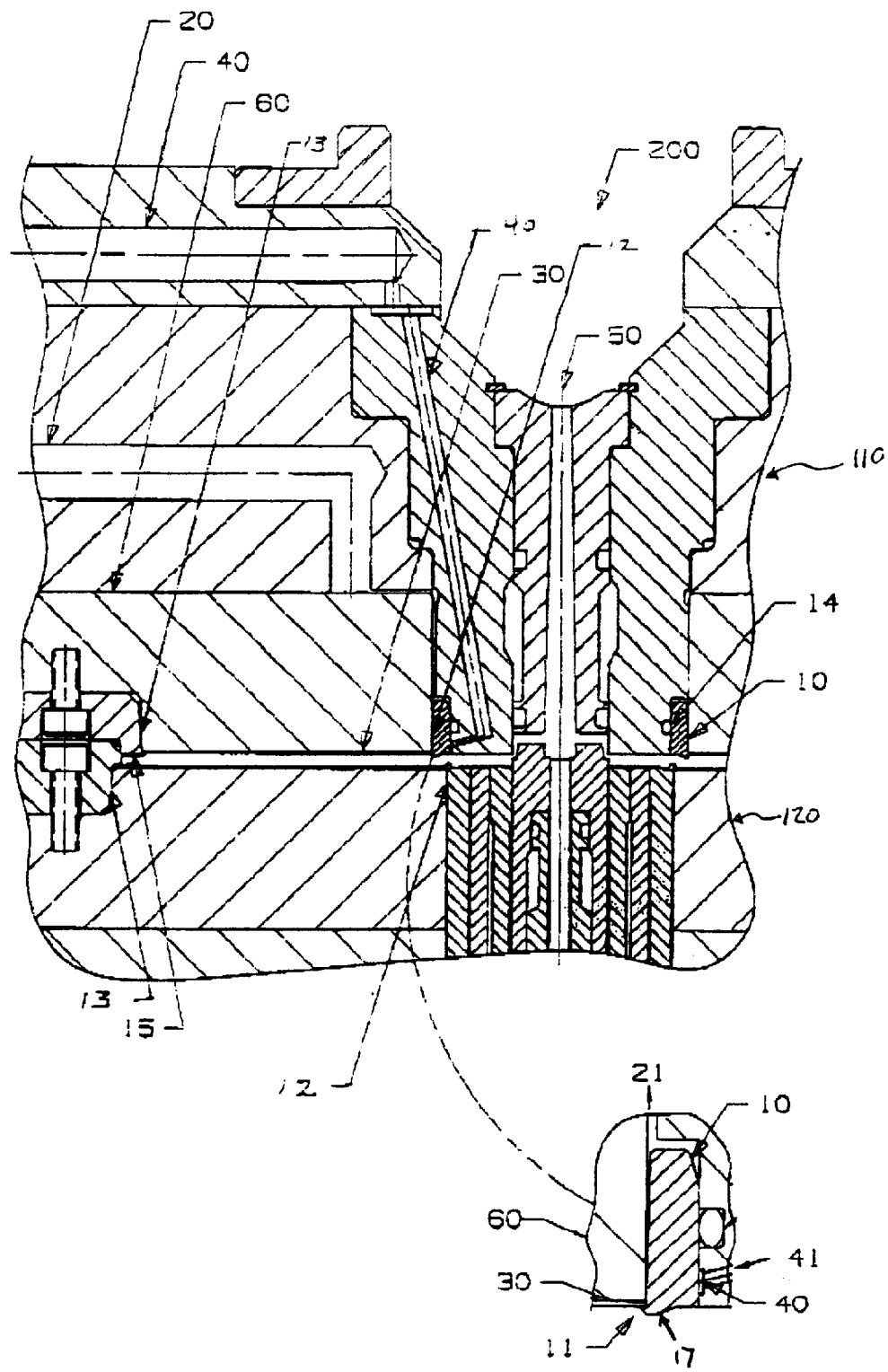
FIG. 2 is a cross sectional view of an embodiment of a mold having a holder, a vacuum line and a demolding line.

FIG. 2 is a cross sectional view of another embodiment of an improved mold 200 for manufacturing a substrate 412 for a single-substrate double-sided storage article 410, the improved mold 200 in this embodiment includes a demolding line 40 in combination with the holder 10 and vacuum line 20. In this embodiment, mold 200 includes a holder 10 extending over a portion of a stamper 30 and a vacuum line 20 in combination with a demolding line 40. The vacuum line 20 is used to apply a vacuum pressure or retention force 21 to the holder 10 in order to maintain the interface 11 between the holder 10 and the stamper 30. Once the article is molded, the demolding line 40 can be used to apply demolding force 41 directly to the formed substrate to aid in separating the substrate from the stamper 30. Here, the interface 11 between the holder 10 and the stamper 30 creates a barrier that prevents the resin from entering the vacuum line 20 during the molding process.

As in the previous embodiment, the holder 10 can be released and the stamper 30 removed by reducing the retention force 21 created by vacuum line 20 and, in one embodiment, providing positive air pressure through vacuum line 20, thereby eliminating the need to remove and reinstall fasteners and improving the ease of stamper 30 changeover. The demolding line 40, holder 10, and vacuum line 20 can be used in any portion of the mold 200 including the inner portion 12 of the fixed side 110 of the mold 200 where space and access to the inner portion 12 of the mold 200 is typically limited. Unlike conventional molds which typically include a stamper only on the moveable side of the mold, the features of this embodiment can be used to create a mold 200 having a demolding line 40 and a stamper 30 on both the fixed side 110 and moveable side 120 of the mold 200. Thus the mold 200 can be used to produce a substrate 412 for a single-substrate double-sided storage article 410.

Use of the demolding line 40 to aid separation of the substrate 412 from the stamper 30 also helps to maintain process indicia of the substrate 412 by preventing warping during separation of the substrate from the stamper. Furthermore, use of a demolding line 40 can avoid damage to the mold 200 in cases where the formed substrate may be susceptible to sticking to the stamper 30. The demolding line 40 can prevent damage to the stamper 30 and mirror block 60 due to the mold 200 closing with the substrate ajar within the mold 200. This can prevent additional expense due to replacement of mold components and disruption to the production process.

Space on the inner portion 12 of the fixed side 110 of a conventional mold is limited as convention molds typically include an injection nozzle 50 in the inner portion 12 of the fixed side 110 of the mold 100 for injection of mold resin. Use of a vacuum line 20 for maintaining the interface 11 between the holder 10 and the stamper 30 allows for placement of a holder 10 on the inner portion 12 of the fixed side 110 of the mold 100 where space is limited. In addition, vacuum line 20 eliminates the need for fasteners and, therefore, reduces the time required for stamper 30 changeover during manufacturing. This is particularly helpful in production situations where frequent stamper 30 changeover is required.

FIG. 3 illustrates a view of one embodiment of a single-substrate double-sided storage article 410 including a substrate 412 formed by the above-described apparatus and process. One application of the single-substrate double-sided data storage article 410 is in near field format applications. Substrate 412 can be formed from a material or resin such as thermoset, thermoplastic, glass, and metal. In another embodiment, the substrate can be formed from a polycarbonate material. Substrate 412 includes surface profiles 407 and 409. Coatings 429 are formed on surface profiles 407 and 409 respectively, and are suitable for storing data. The mold 100, 200 can be used to produce storage articles 412 of a variety of desired thicknesses.

Molds 100 and 200 can be used with stampers 30 for imparting either a positive or negative surface profile 407 or 409. In one embodiment, the apparatus 100, '200 and process can be used to produce a single-substrate double-sided storage article 410 having either a positive or negative surface profile on each side of the storage article 410. The surface profiles 407 and 409 may take many shapes and forms. For example, the geometry of the profiles 407 and 409 may be continuous, broken into short segments or a combination of the two. These profiles 407 and 409 may be a continuous spiral, circular shape, or radial geometry to name a few. The geometry of the profiles 407 and 409 can vary in physical height, orientation and density. The geometry of profiles 407 and 409 may have an angular draft in the sides of the geometry that is parallel to the direction of ejection.

In one embodiment, the substrate 412 having a surface profile 407 and 409 on the first side 414 and the second side 416 of the substrate 412 is used in an air incident single-substrate double-sided data storage article 410. In one embodiment, the substrate 412 is used in a rewritable optical single-substrate double-sided data storage article 412 having a coating 429 on both sides, the coating 429 including a recording layer. In one embodiment, the recording layer comprises a magneto-optic recording material. In one embodiment, the recording layer is formed on the substrate 412 in a manner substantially similar to that described in U.S. Pat. No. 5,972,461. In another embodiment, data storage article 410 is formed using a substrate 412 having a coating 429 including reflective layer, a first dielectric layer, a recording layer and a second dielectric layer on each side of the data storage article. In one embodiment, the reflective layer, the first dielectric layer, the recording layer and the second dielectric layer are formed on the substrate in a manner substantially similar to that described in U.S. Pat. No. 5,972,461.

Various embodiments have been described for an improved mold for producing substrates for data storage articles. In one embodiment a retention force is applied to a holder such that the holder maintains an interface with a stamper. The interface between the holder and the stamper provides a barrier to prevent resin from entering both the vacuum line and other mold cavities during the molding process. In another embodiment, a demolding force is applied to the substrate to aid in separating the substrate from the stamper and a retention force is applied to a holder such that the holder maintains an interface with a stamper. The interface between the holder and the stamper provides a barrier to prevent resin from entering the vacuum line and other mold cavities during the molding process.

The embodiments presented provide for a single-substrate double-sided data storage article having increased storage capacity due to increased flatness of the substrate and increased storage space on both a first side and a second side of the substrate. According to the invention, production of a single-substrate double-sided data storage article eliminates steps typically involved in the manufacturing process of conventional double-sided disks such as is found in bonding two single-sided disks. Additionally, use of the vacuum line and retention force to maintain and release the position of the holder against the stamper provides for easier and faster stamper changeover. Furthermore, the location and design of the demolding line can reduce expensive damage to mold components and can reduce delay in the production process.

Though the embodiments presented relate to a mold for producing a single-substrate double-sided data storage article, the features of the above embodiments can be used to manufacture a mold for producing a single-sided data storage article having a substrate with surface profile and coating formed on surface profile also having improved process indicia. In one embodiment, the single-sided substrate having improved process indicia can be used to produce an air incident data storage article. In one embodiment, the single-sided substrate having improved process indicia can be used to produce a substrate incident data storage article. In one embodiment, the single-sided substrate having improved process indicia can be bonded to another single-sided substrate to form a double-sided data storage article.

What is claimed is:

1. A mold for manufacturing disks, comprising:
    a stamper;
    at least one vacuum-driven holder having an interface with the stamper; and
    a vacuum line for applying a retention force to the vacuum-driven holder to maintain the interface between the vacuum-driven holder and the stamper.

2. The mold of claim 1 wherein the vacuum-driven holder prevents resin from entering the vacuum line.

3. The mold of claim 1 wherein the mold has a fixed side and wherein the stamper, vacuum-driven holder and vacuum line are on the fixed side of the mold.

4. The mold of claim 1 wherein the mold is used to manufacture a substrate having a surface profile on one side.

5. The mold of claim 1 wherein the mold has a fixed side and a moveable side and wherein the vacuum-driven holder, vacuum line and stamper are on either the fixed side or the moveable side and wherein a second stamper is on the other of the side of the mold.

6. The mold of claim 5 wherein the mold is used to manufacture a substrate having a surface profile on both sides of the substrate.

7. The mold of claim 1 further comprising an injection nozzle and wherein the stamper, vacuum-driven holder and vacuum line are located proximate the injection nozzle.

8. A mold for manufacturing a substrate, comprising:
    a stamper;
    at least one vacuum-driven holder having an interface with the stamper;
    a vacuum line for applying a retention force to the vacuum-driven holder to maintain the interface between the vacuum-driven holder and the stamper; and
    a demolding line for applying a demolding force to the substrate to aid in separating the substrate from the stamper.

9. The mold of claim 8 wherein the vacuum-driven holder prevents resin from entering the vacuum line during the mold process.

10. The mold of claim 8 wherein the mold has a fixed side and wherein the stamper, vacuum-driven holder, vacuum line and demolding line are on the fixed side of the mold.

11. The mold of claim 8 wherein the mold is used to manufacture the substrate to have a surface profile on one side.

12. The mold of claim 8 wherein the mold has a fixed side and a moveable side and wherein the stamper, vacuum-driven holder, vacuum line and demolding line are on either the fixed side or the moveable side and wherein a second stamper is on the other of the sides of the mold.

13. The mold of claim 12 wherein the mold is used to manufacture the substrate to have a surface profile on both sides of the substrate.

14. The mold of claim 8 further comprising an injection nozzle and wherein the stamper, vacuum-driven holder, vacuum line and demolding line are located proximate the injection nozzle.

* * * * *